Figure 4:
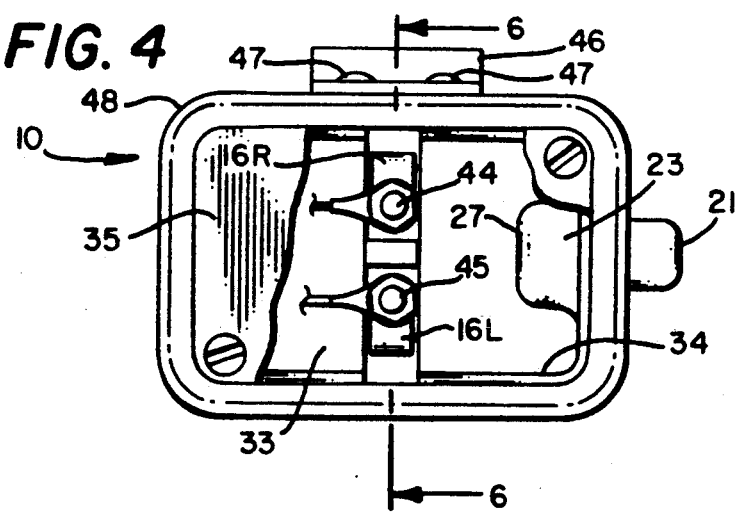

United States Patent
Womack

Patent Number: 5,217,824
Date of Patent: Jun. 8, 1993

[54] BATTERY HOLDER

[76] Inventor: Robert C. Womack, 5119 Radbrook Pl., Dallas, Tex. 75220

[21] Appl. No.: 779,983

[22] Filed: Oct. 21, 1991

[51] Int. Cl.$^5$ ............................................. H01M 2/10
[52] U.S. Cl. ..................................... 429/96; 429/97; 429/100; 429/123
[58] Field of Search ................... 429/96, 97, 100, 123

[56] References Cited

U.S. PATENT DOCUMENTS 4,530,034  7/1985  Kawarada .
4,943,498  7/1990  Cooper et al. .

Primary Examiner—Olik Chaudhuri
Assistant Examiner—M. Nuzzolillo
Attorney, Agent, or Firm—Warren H. Kintzinger

[57] ABSTRACT

A battery holder of electrical non-conductive plastic, shorter than elongate batteries inserted therein, is provided having an opening receiving the upper contact end of an elongate nickel-cadmium battery that generally come in 7.2 volt and 9.6 volt capacities. The plastic cases of these batteries have opposite side openings to opposite battery terminals and a detent opening on an end of the top insert portion of the battery. A manually pressable release detent latching lever is pivotally mounted in the battery holder and resiliently biased to the detent battery hold position. A cam surface on the detent is engaged by the top edge of the battery and case structure and the dentent is camed outwardly as the battery assembly is being inserted into the opening of the plastic battery holder and then is snapped back into the detent hold state in the detent opening of the battery and case assembly. A two path connection socket is provided with the battery holder and a resistor, contained within an upper chamber of the holder, is in series with the electric circuit path specific to the voltage rating of the battery being held by the holder so that six volts be provided to six volt bulbs (halogen bulbs) connected to the socket.

17 Claims, 2 Drawing Sheets

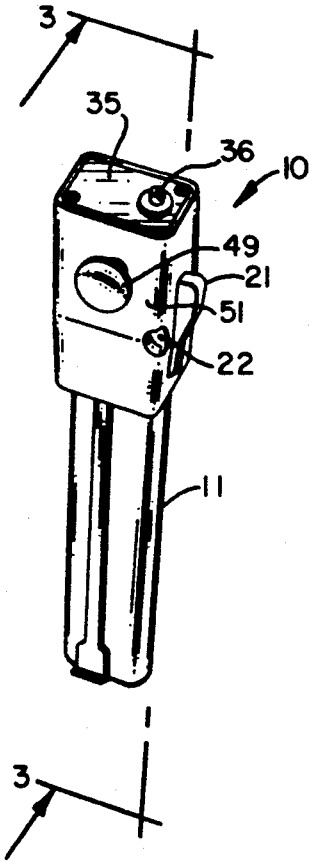
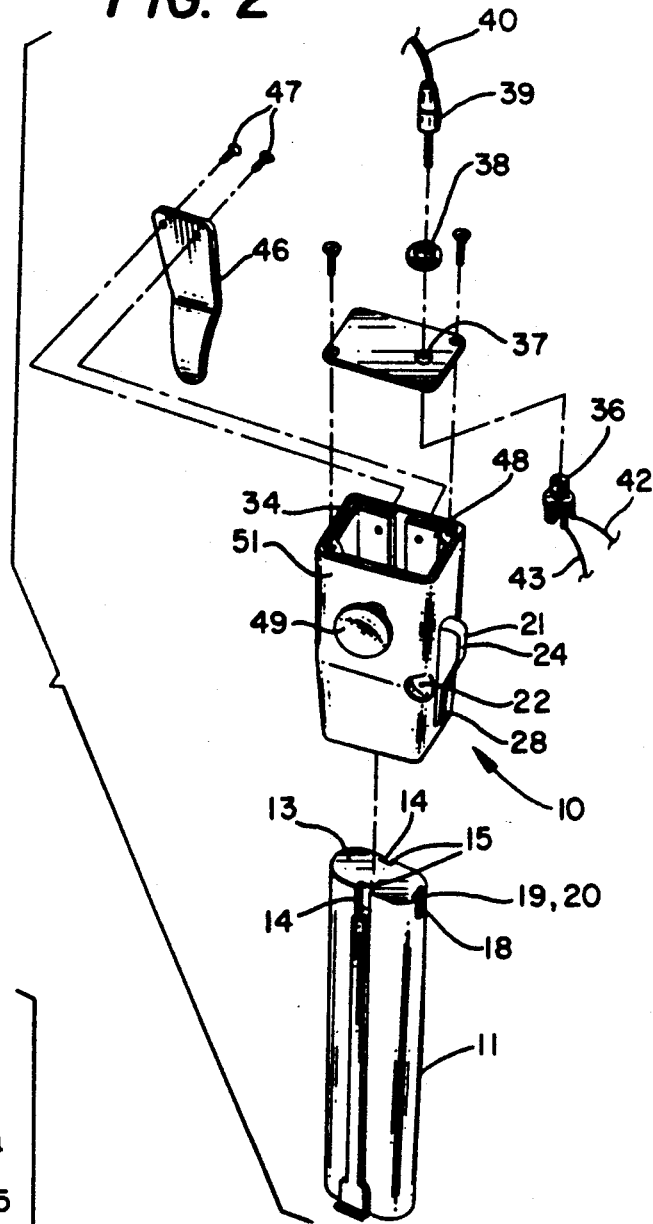
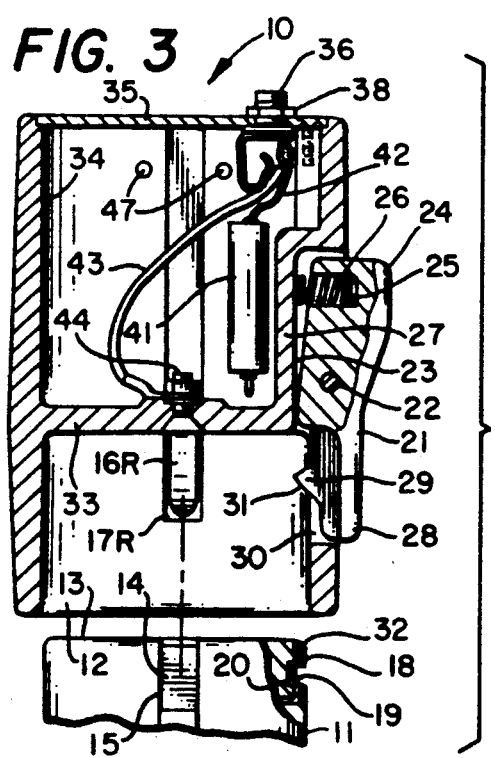
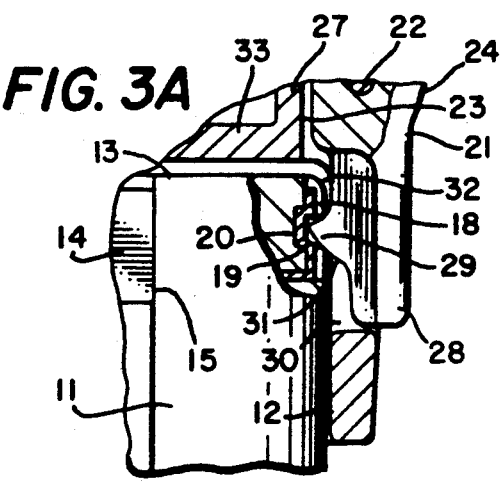

BATTERY HOLDER

This invention relates in general to battery holders, and more particularly, to a battery holder having a bottom opening receiving the upper electrical contact end of elongate nickel-cadmimum batteries with cammed detent entry hold and a manual release detent latching lever.

Many mechanics use fast charge nickel-cadmimum batteries in powering battery powered tools with these batteries, either 7.2 volt or 9.6 volt rated, being made by several companies in the United States and abroad. These batteries commonly include a detent like opening in a metal contact, used in charging, adjacent the battery top. The holders for these elongate batteries have heretofor included a clip over the bottom end of the batteries as an aid to their being held in holders (or plastic housings) generally over twice as long as applicant's holder. These pre-existing holders are much bulkier and heavier than desired, cumbersome and generally more expensive.

It is therefore a principal object of this invention to provide an easy to use, quick insert and release battery holder.

Another object is to provide such a battery holder smaller and more compact than pre-existing holders for elongate nickel-cadmimum batteries.

A further object is to provide such a battery holder at lower cost than with pre-existing batteries.

Still another object with such a battery holder with both a snap fastener for mounting on a user's belt and a suction cup for convenience mounting on smooth surfaces.

Features of the invention useful in accomplishing the above objects include, in a new battery holder, a battery holder of electrical non-conductive plastic is provided with a bottom opening receiving the upper contact end of an elongate nickel-cadmium battery that generally come in 7.2 volt and 9.6 volt capacities. The plastic cases of these batteries have opposite side openings to opposite battery terminals and a detent opening on an end of the top insert portion of the battery. A manually pressable release detent latching lever is pivotally mounted in the short battery holder and resiliently biased to the detent battery hold position. A cam surface on the detent is engaged by the top edge of the battery and case structure and the detent is camed outwardly as the battery assembly is being inserted into the opening of the plastic battery holder and then is snapped back into the detent hold state in the detent opening of the battery and case assembly. A two path connection socket is provided with the battery holder and a resistor, contained within an upper chamber of the holder, is in series with the electric circuit path specific to the voltage rating of the battery being held by the holder so that six volts be provided to six volt bulbs (halogen bulbs) connected to the socket.

A specific embodiment representing what is presently regarded as the best mode of carrying out the invention is illustrated in the accompanying drawings.

Figure 5:
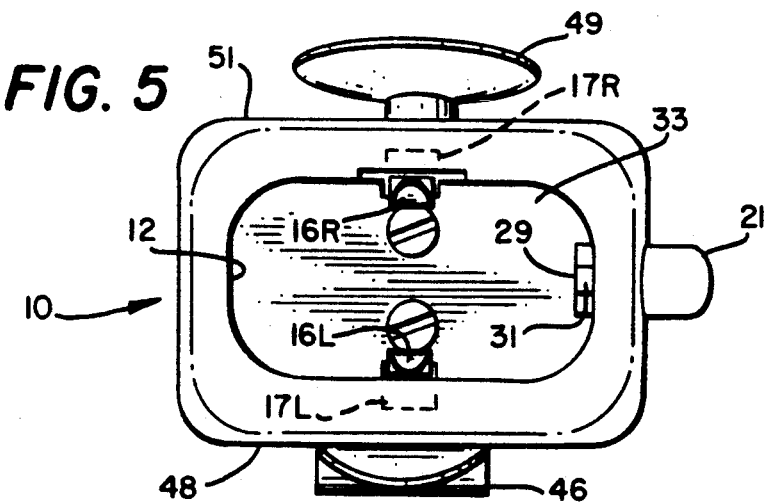
Figure 6:
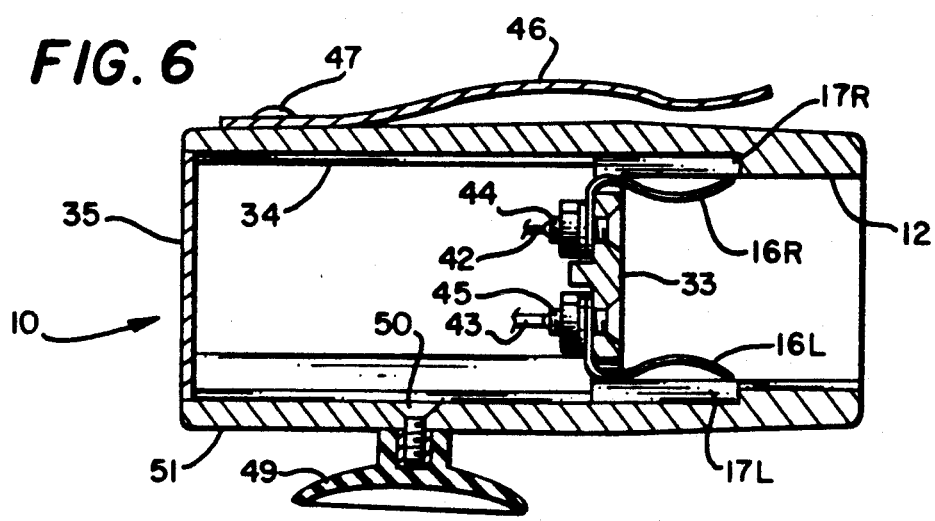

In the drawings:

FIG. 1 is a perspective view of the battery holder holding an elongate nickel cadmimum battery with a detent latch on the holder;

FIG. 2, an exploded perspective view of the battery holder and a battery insertable into a bottom opening of the holder;

FIG. 3, a broken away and sectioned view taken along lines 3—3 of FIG. 1 showing interior detail of the battery holder;

FIG. 3A, an enlarged partial section view showing battery holder detail including the lever detent in the battery retaining state;

FIG. 4, a partially cut away top plan view of the battery holder showing top chamber interior detail;

FIG. 5, a bottom plan view of the battery holder showing bottom battery insert opening detail; and, FIG. 6, a broken away and sectioned elevation view taken along line 6—6 of FIG. 4 showing interior detail and mounting device structure of the battery holder.

Referring to the drawings:

The battery holder 10 of FIGS. 1-6 is shown in FIG. 1 to be holding an elongate nickel-cadmium battery 11 inserted into holder bottom opening 12 referring also to FIGS. 3 and 3A. The upper contact end 13 of the elongate batteries that generally come with either a 7.2 volt or 9.6 volt rated capacity have opposite side electrically conductive contacts 14 that are exposed through opposite side openings 15 in the case of battery 11 for electrical circuit conductive contact with resilient spring contacts 16L and 16R extended downward into holder bottom opening 12 in line with space relief slots 17L and 17R into which the contacts 16L and 16R may extend when a battery 11 is inserted into the holder bottom opening 12. The elongate nickel cadmium batteries 11 also include a detent opening 18 on and end of the top of battery 11 containing a detent opening 19 equipped metal contact 20 otherwise used in charging of the battery 11.

Manually pressable release detent hold latching lever 21 is an elongate plastic lever pivotally mounted on pivot pin 22 in recess 23 of the holder 10. The lever 21 has an upper portion 24 with a coil spring 25 enclosing opening 26 for the spring pressing against upper housing wall 27 of the holder resiliently pressing the upper portion 24 outwardly and thereby the lower lever portion 28 with detent projection 29 inwardly in holder opening 30 on into detent holding engagement with detent opening 19. Detent projection 29 has a bottom sloped cam surface 31 that is cammed outwardly by the upper top corner of the battery 11 as it is inserted in holder bottom opening 12 to then snap into the detent holding state in detent opening 19.

Battery holder 10 has an internal wall 33 separating the bottom holder opening 12 from an upper container opening 34 closed at the top by enclosure plate 35 that mounts a two path electrical connection socket 36 held therein extending through opening 37 by nut 38. Plug 39, of cable 40 to a halogen light (not shown), is insertable in socket 36. A resistor 41, specific to battery rating to provide proper voltage for a six volt halogen light bulb is included in the circuit of one of the two socket leads 42 and 43 circuit connected to terminal posts 44 and 45 mounted on the top of holder wall 33 and connected respectively to spring contacts 16L and 16R.

A belt holder clasp 46 is mounted by screws 47 to holder wall 48 for mounting of the holder 10 with a battery 11 inserted therein on a person's belt (not shown) and a suction cup 49 is mounted by screw 50 on the opposite side holder wall 51 as another mounting method for the holder 10.

Pressing the upper portion 24 of detent latching lever 21 inward against the resilient force of coil spring 25 pivots the lever around pivot pin 22 to move the lever detent 29 outward from the battery detent opening 19 to release the battery 11 from holder 10 bottom opening 12.

Whereas this invention has been described with respect to several embodiments thereof, it should be realized that various changes may be made without departure from the essential contributions to the art made by the teachings hereof.

I claim:

1. A battery holder shorter than elongate batteries inserted therein comprising: a battery holder having an opening receiving the electrical contact end of an elongate battery having a detent opening at the battery electrical contact end; a detent latching lever pivotally mounted for movement between a battery release position and a detent battery hold position on said battery holder; resilient spring means mounted on said battery holder biasing said detent latching lever to said detent battery hold position; and said detent latching lever having a manually pressable release portion pressable to, against the resilient force of said spring means, pivot said detent latching lever to the battery release position.

2. The battery holder of claim 1, wherein said detent latch is pivotally mounted by a pivot pin mounted in said battery holder and extended through an opening through said detent latching lever.

3. The battery holder of claim 2, wherein said resilient spring means is a resiliently compressable coil spring; a spring receiving and holding opening in said manually pressable release portion of said detent latching lever with said coil spring resiliently compressed between a holder housing wall and the manually pressable release portion of said detent latching lever.

4. The battery holder of claim 2, wherein said detent latch includes a detent projection moveable into and out of said detent opening in said elongate battery.

5. The battery holder of claim 4, wherein said detent projection includes a cam surface for camming the detent latch deterent projection outwardly as a battery is inserted into said battery holder opening.

6. The battery holder of claim 4, wherein said battery holder includes a case formed with a detent latching lever receiving opening having a wall against which said coil spring presses.

7. The battery holder of claim 6, wherein a through wall opening is provided to the holder opening receiving the electrical contact end of an elongate battery for the detent portion of said detent latching lever being moveable into and out of said holder opening for detent hold and release of a battery.

8. The battery holder of claim 7, wherein said short battery holder opening receiving the electrical contact end of an elongate battery is a bottom open battery top end receiving battery holding opening; and with said battery holder formed with an upper chamber separated from said battery holder opening by an internal wall; with said upper chamber closed at the top by a plate mounting a two path electrical connection socket; resilient spring contacts mounted to extend through said internal wall to contact opposite side contacts of a battery electrical contact end inserted in the bottom holder opening; said resilient spring contacts having terminal connections, respectively, with a two wire circuit connection to said two path electrical connection socket; and resistor means in said two wire circuit connection such that the voltage level imposed on a bulb connected to the two path electrical connection socket matches the voltage rating of the bulb.

9. The battery holder of claim 8, wherein spring contact recess openings are provided in opposite side walls of said bottom open battery top end receiving battery holding opening in line with said resilient spring contacts to accomodate movement of said resilient spring contacts thereinto when a battery is inserted into the holder and opposite side electrical contacts of the battery are brought into engagement with said resilient spring contacts.

10. The battery holder of claim 9, wherein a belt holder clasp is mounted on a holder wall for mounting of the battery holder with a battery inserted therein on a person's belt.

11. The battery holder of claim 9, wherein a suction cup is mounted on a holder wall for mounting of the battery holder with a battery inserted therein on a smooth surface of convenience.

12. The battery holder of claim 9, wherein a belt holder clasp is mounted on a first side wall of said battery holder; and a suction cup is mounted on a second side wall of said battery holder for alternate mounting of said battery holder with a battery inserted therein.

13. The battery holder of claim 1, wherein said battery holder opening receiving the electrical contact end of an elongate battery is a bottom open battery top end receiving battery holding opening; and with said battery holder formed with an upper chamber separated from said battery holder opening by an internal wall; with said upper chamber closed at the top by a plate mounting a two path electrical connection socket; resilient spring contacts mounted to extend through said internal wall to contact opposite side contacts of a battery electrical contact end inserted in the bottom holder opening; said resilient spring contacts having terminal connections, respectively, with a two wire circuit connection to said two path electrical connection socket; and resistor means in said two wire circuit connection such that the voltage level imposed on a bulb connected to the two path electrical connection matches the voltage rating of the bulb.

14. The battery holder of claim 13, wherein spring contact rescess openings are provided in opposite side walls of said bottom open battery top end receiving battery holding opening in line with said resilient spring contacts to accomodate movement of said resilient spring contacts thereinto when a battery is inserted into the holder and opposite side electrical contacts of the battery are brought into engagement with said resilient spring contacts.

15. The battery holder of claim 14, wherein a belt holder clasp is mounted on a holder wall for mounting of the short battery holder with a battery inserted therein on a person's belt.

16. The battery holder of claim 14, wherein a suction cup is mounted on a holder wall for mounting of the battery holder with a battery inserted therein on a smooth surface of convenience.

17. The battery holder of claim 14, wherein a belt holder clasp is mounted on a first side wall of said battery holder; and a suction cup mounted on a second side wall of said battery holder for alternate mounting of said battery holder with a battery inserted therein.

* * * * *